United States Patent
Dube et al.

(10) Patent No.: US 11,794,227 B2
(45) Date of Patent: Oct. 24, 2023

(54) WORKING ROLLER FOR A ROLLING MILL FOR LAMINATING A SHEET OF ALKALI METAL OR ALLOY THEREOF INTO A FILM

(71) Applicant: BLUE SOLUTIONS CANADA INC., Boucherville (CA)

(72) Inventors: Jonathan Dube, La Prairie (CA); Francois Lapierre, Boucherville (CA)

(73) Assignee: BLUE SOLUTIONS CANADA INC., Boucherville (CA)

( * ) Notice: Subject to any disclaimer, the term of this patent is extended or adjusted under 35 U.S.C. 154(b) by 164 days.

(21) Appl. No.: 16/951,252

(22) Filed: Nov. 18, 2020

(65) Prior Publication Data
US 2021/0146411 A1    May 20, 2021

Related U.S. Application Data

(60) Provisional application No. 62/936,809, filed on Nov. 18, 2019, provisional application No. 62/936,806, (Continued)

(51) Int. Cl.
*B21B 3/00* (2006.01)
*B21B 31/08* (2006.01)
(Continued)

(52) U.S. Cl.
CPC ............... *B21B 3/00* (2013.01); *B21B 1/40* (2013.01); *B21B 27/10* (2013.01); *B21B 29/00* (2013.01);
(Continued)

(58) Field of Classification Search
CPC .. B21B 3/00; B21B 1/40; B21B 27/10; B21B 27/021; B21B 27/02; B21B 45/0251;
(Continued)

(56) References Cited

U.S. PATENT DOCUMENTS 2,732,591 A * 1/1956 Whittum ............... B21B 27/02
                                                    72/701
3,593,556 A * 7/1971 Blain ..................... B21B 31/16
                                                    415/129
(Continued)

FOREIGN PATENT DOCUMENTS

CN          106311747 A  *  1/2017
CN          107442570 A  * 12/2017  ............... B21B 1/40
(Continued)

OTHER PUBLICATIONS

Machine translation of CN-106311747-A (Year: 2017).*
International Search Report and Written opinion issued in corresponding International application No. PCT/CA2020/051570 dated Jan. 25, 2021.

*Primary Examiner* — Katrina M Stransky
*Assistant Examiner* — Teresa A Guthrie
(74) *Attorney, Agent, or Firm* — BCF LLP

(57) ABSTRACT

A working roller for a rolling mill for laminating a sheet of alkali metal or alloy thereof into a film is disclosed. The working roller has a cylindrical center portion defining a central axis, the center portion having an outer surface defining a lamination surface; and first and second frustoconical portions extending from first and second ends of the center portion respectively. When the central axis is straight, an angle between the outer surface of the center portion and an outer surface of each of the first and second frustoconical portions is less than 0.05 degrees. A width of the center portion is greater than a width of each of the first and second frustoconical portions. The width of the center portion is less than a sum of the widths of the first and second portions. A rolling mill having two such working rollers is also disclosed.

8 Claims, 10 Drawing Sheets

Related U.S. Application Data filed on Nov. 18, 2019, provisional application No. 62/936,814, filed on Nov. 18, 2019.

(51) Int. Cl.
 *B21B 27/10* (2006.01)
 *B21B 45/02* (2006.01)
 *B21B 1/40* (2006.01)
 *B21B 29/00* (2006.01)
 *B21B 27/02* (2006.01)
 *H01M 4/04* (2006.01)
 *H01M 10/052* (2010.01)

(52) U.S. Cl.
 CPC .......... *B21B 31/08* (2013.01); *B21B 45/0251* (2013.01); *H01M 4/0435* (2013.01); *H01M 10/052* (2013.01); *B21B 2003/001* (2013.01); *B21B 2027/022* (2013.01)

(58) Field of Classification Search
 CPC .............. B21B 2003/001; B21B 29/00; B21B 2027/022; B21B 37/38; B21B 31/16; B21B 31/20; B21B 2267/02; B21B 2267/06; B21B 2267/10; B21B 2269/02; B21B 2269/04
 USPC ................................ 72/6.2, 252.5; 492/1, 27
 See application file for complete search history.

(56) References Cited

U.S. PATENT DOCUMENTS

| | | | | |
|---|---|---|---|---|
| 4,703,641 A | * | 11/1987 | Yarita | B21B 37/40 |
| | | | | 72/247 |
| 4,926,666 A | * | 5/1990 | Gotting | B41F 13/21 |
| | | | | 72/247 |
| 5,174,144 A | * | 12/1992 | Kajiwara | B21B 13/142 |
| | | | | 72/247 |
| 5,528,920 A | | 6/1996 | Bouchard et al. | |
| 5,837,401 A | | 11/1998 | Armand et al. | |
| 6,019,801 A | | 2/2000 | Armand et al. | |
| 6,868,707 B2 | | 3/2005 | Nishi et al. | |
| 7,181,949 B2 | | 2/2007 | Haberkamm et al. | |
| 7,513,136 B2 | | 4/2009 | Gagnon et al. | |
| 9,605,229 B2 | | 3/2017 | Cotton et al. | |
| 2018/0281036 A1 | | 10/2018 | Shingu et al. | |

FOREIGN PATENT DOCUMENTS

| | | | | |
|---|---|---|---|---|
| DE | 4424613 | A1 | 1/1996 | |
| GB | 1177629 | A | * 1/1970 | ............. B21B 13/14 |
| JP | 6277566 | B1 | 2/2018 | |
| KR | 100478084 | B1 | 7/2005 | |
| KR | 101376563 | B1 | 3/2014 | |

* cited by examiner

WORKING ROLLER FOR A ROLLING MILL FOR LAMINATING A SHEET OF ALKALI METAL OR ALLOY THEREOF INTO A FILM

CROSS-REFERENCE

This application claims the benefit of U.S. Provisional Application No. 62/936,806, filed Nov. 18, 2019, and of U.S. Provisional Application No. 62/936,809, filed on Nov. 18, 2019, and U.S. Provisional Application No. 62/936,814, filed on Nov. 18, 2019, the disclosure of all of which is incorporated herein by reference in its entirety.

FIELD OF TECHNOLOGY

The present technology relates to working rollers for rolling mills for laminating sheets of alkali metal or alloy thereof into films and to rolling mills having such working rollers.

BACKGROUND

Rechargeable batteries manufactured from laminates of solid polymer electrolytes and thin films anodes and cathodes display many advantages over conventional liquid electrolytes batteries. These advantages include lower overall battery weight, high specific energy, longer service life, and environmental friendliness since the danger of spilling toxic liquid into the environment is eliminated.

Solid polymer battery components include positive electrodes, negative electrodes and an insulating material capable of permitting ionic conductivity, such as a solid polymer electrolyte sandwiched between the electrodes. The anodes or negative electrodes are usually made of lightweight metals films, such as alkali metals and alloys thereof, such as lithium metal, lithium-aluminum alloys and the like. The composite cathodes or positive electrodes are usually formed of a mixture of active material such as transitional metal oxide, an electrically conductive filler, usually carbon particles, an ionically conductive polymer electrolyte material and a current collector usually a thin sheet of aluminum. Composite cathode thin films are usually obtained by coating onto a current collector.

The production of thin films of lithium having a thickness lower than 100 microns in the form of wide bands, for example 10 centimeters or more, and in lengths of many hundreds of meters by means of rapid and reliable processes, faces important technical difficulties which are attributable to the extreme physical and chemical properties of this metal, such as chemical reactivity, malleability, low mechanical strength, rapid self-welding by simple contact and strong adhesion on most solid materials.

Cold extrusion is used for the continuous production of sheets of 100 microns or more. These thicknesses are generally adapted to the production of lithium cells utilizing liquid electrolytes. For lower thicknesses, the films obtained by extrusion are thereafter laminated between working rollers made of hard materials.

In large scale production processes, the difficulties in achieving the efficient lamination of dense lithium to a thickness varying between 20 and 100 microns for the production of polymer electrolyte cells are numerous.

The laminated lithium metal often reacts with, and/or deforms, and adheres to the working rollers with which it is in contact during the lamination process. This problem can been solved by the use of a lubricating agent as described in U.S. Pat. Nos. 5,837,401, 5,528,920 and 6,019,801, the entirety of each of which is incorporated herein by reference. The lubricating agent comprises additives which prevent the thin laminated lithium film from reacting or excessively adhering to the working rollers and does not effect the electrochemistry of the resulting electrochemical cell. However, there is a desire for a proper and efficient application of the lubricant during the lamination process.

The extreme ductility of lithium or alloys thereof allows only minuscule drawing tension on the lithium film exiting the working rollers. The drawing tension must therefore be precisely monitored and controlled to prevent breakage or ripping of the lithium film and consequently, costly interruptions of production.

With a thickness between 20 to 100 microns, it is difficult to laminate a film of lithium or alloy thereof to a constant thickness across the entire width of the film and over extended lengths of the film. Variations of thickness occur across the width of the laminated lithium film in conventional lamination processes which promote breakage of the lithium film during the lamination operation and renders the resulting laminated lithium film less than adequate for electrochemical cells.

Working rollers are traditionally made of polyacetal, a hard plastic material which is compatible with lithium (i.e. it does not react with lithium). However, for large scale production, the polyacetal rollers wear out rapidly and necessitate frequent replacement and discarding of the worn out rollers, thereby drastically increasing cost. This renders the lamination manufacturing process economically difficult.

Thus there is a desire for a rolling mill adapted for laminating a sheet of alkali metal or alloy thereof into a film that addresses at least some of the above problems. There is also a desire for alkali metal films produced by such rolling mills which maintain desirable properties over the width and the length of the films.

SUMMARY

It is an object of the present technology to ameliorate at least some of the inconveniences present in the prior art.

According to one aspect of the present technology there is provided a rolling mill for laminating a sheet of alkali metal or alloy thereof into a film. The rolling mill has a frame; a first working roller rotationally mounted to the frame; a second working roller rotationally mounted to the frame, the first and second working rollers being positioned to receive the sheet therebetween; at least two first actuators operatively connected to opposite ends of the first working roller for bending the first working roller; and at least two second actuators operatively connected to opposite ends of the second working roller for bending the second working roller. Each of the first and second working rollers has a cylindrical center portion defining a central axis, the center portion having an outer surface defining a lamination surface; a first frustoconical portion extending from a first end of the center portion; and a second frustoconical portion extending from a second end of the center portion. When the central axis is straight, an angle between the outer surface of the center portion and an outer surface of each of the first and second frustoconical portions is less than 0.05 degrees. A width of the center portion is greater than a width of each of the first and second frustoconical portions. The width of the center portion is less than a sum of the widths of the first and second portions.

In some embodiments of the present technology, the angle is less than 0.03 degrees.

In some embodiments of the present technology, the angle is less than 0.02 degrees.

In some embodiments of the present technology, the angle is more than 0.01 degrees.

In some embodiments of the present technology, for each of the first and second working rollers, the center portion, the first frustoconical portion and the second frustoconical portion have a chrome coating.

In some embodiments of the present technology, the chrome coating is a hard chrome coating.

In some embodiments of the present technology, for each of the first and second working rollers, the center portion, the first frustoconical portion and the second frustoconical portion have a surface roughness in a range between 0.025 microns Ra and 0.5 microns Ra.

In some embodiments of the present technology, the range is between 0.05 microns Ra and 0.3 microns Ra.

In some embodiments of the present technology, for each of the first and second working rollers, the first and second frustoconical portions taper as they extend away from the center portion.

In some embodiments of the present technology, for each of the first and second working rollers: a first shoulder is defined between the center portion and the first frustoconical portion; and a second shoulder is defined between the center portion and the second frustoconical portion.

In some embodiments of the present technology, for each of the first and second working rollers: the first frustoconical portion tapers as the first frustoconical portion extends from an outer end thereof toward the center portion; and the second frustoconical portion tapers as the second frustoconical portion extends from an outer end thereof toward the center portion.

In some embodiments of the present technology, a first backup roller is rotationally mounted to the frame. The first backup roller is in contact with the first working roller for applying a pressure on the first working roller. A second backup roller is rotationally mounted to the frame, the second backup roller being in contact with the second working roller for applying a pressure on the second working roller.

According to another aspect of the present technology, there is provided a working roller for a rolling mill for laminating a sheet of alkali metal or alloy thereof into a film. The working roller has a cylindrical center portion defining a central axis, the center portion having an outer surface defining a lamination surface; a first frustoconical portion extending from a first end of the center portion; and a second frustoconical portion extending from a second end of the center portion. Then the central axis is straight, an angle between the outer surface of the center portion and an outer surface of each of the first and second frustoconical portions is less than 0.05 degrees. A width of the center portion is greater than a width of each of the first and second frustoconical portions. The width of the center portion being less than a sum of the widths of the first and second portions.

In some embodiments of the present technology, the angle is less than 0.03 degrees.

In some embodiments of the present technology, the angle is less than 0.02 degrees.

In some embodiments of the present technology, the angle is more than 0.01 degrees.

In some embodiments of the present technology, the center portion, the first frustoconical portion and the second frustoconical portion have a chrome coating.

In some embodiments of the present technology, the chrome coating is a hard chrome coating.

In some embodiments of the present technology, the center portion, the first frustoconical portion and the second frustoconical portion have a surface roughness in a range between 0.025 microns Ra and 0.5 microns Ra.

In some embodiments of the present technology, the range is between 0.05 microns Ra and 0.3 microns Ra.

In some embodiments of the present technology, the first and second frustoconical portions taper as they extend away from the center portion.

In some embodiments of the present technology, a first shoulder is defined between the center portion and the first frustoconical portion. A second shoulder is defined between the center portion and the second frustoconical portion.

In some embodiments of the present technology, the first frustoconical portion tapers as the first frustoconical portion extends from an outer end thereof toward the center portion. The second frustoconical portion tapers as the second frustoconical portion extends from an outer end thereof toward the center portion.

For purposes of the present application, surface roughness is provided in Roughness Average (Ra) expressed in metric units, specifically microns, and angles are expressed in degrees (i.e. 360 degrees for a full rotation). For purposes of the present application, hardness represents the resistance to localized deformation of a material (e.g., sheets and films) which deformation is induced by either mechanical indentation or abrasion. For purposes of the present application, tensile strength (TS) refers to the capacity of a material (e.g., sheets and films) to resist loads tending to elongate such material. The tensile strength is measured by the maximum stress that the material can withstand while being stretched or pulled before breaking.

The term "about" is used herein, explicitly or not; every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. For example, the term "about" in the context of a given value or range refers to a value or range that is within 20%, preferably within 15%, more preferably within 10%, more preferably within 9%, more preferably within 8%, more preferably within 7%, more preferably within 6%, and more preferably within 5% of the given value or range.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
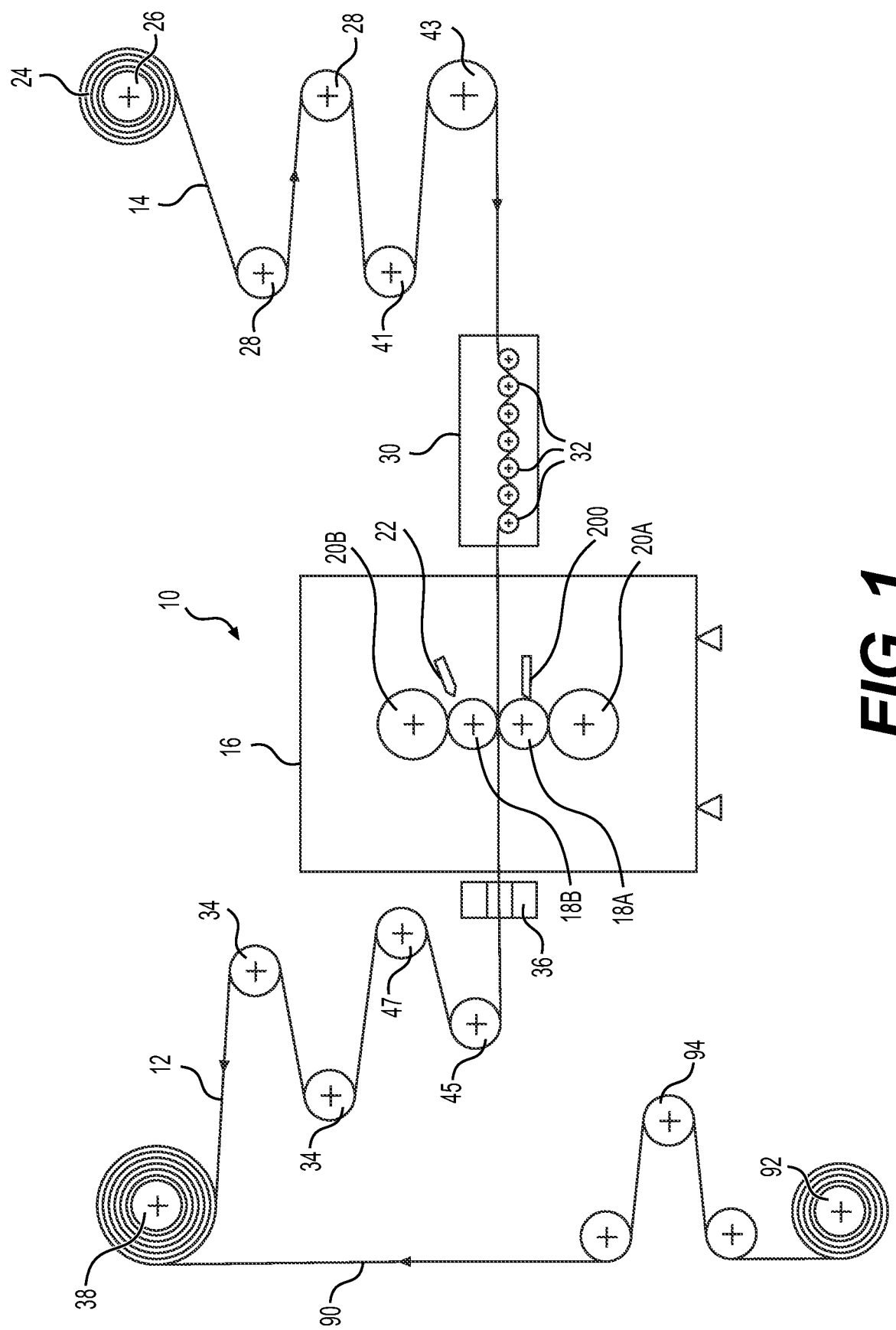
FIG. 1 is a schematic side cross-sectional view of a rolling mill and associated components for laminating a lithium or lithium alloy sheet into a thin film.

FIG. 1 schematically illustrates a rolling mill 10 and associated components adapted to produce a lithium or lithium alloy thin film 12 of less than 100 microns thick from a previously extruded lithium or lithium alloy sheet 14 of about 100 to 500 microns thick. Although embodiments of the present technology will be described with respect to the production of a lithium or lithium alloy thin film 12 from a lithium or lithium alloy sheet 14, it is contemplated that at least some aspects of the present technology could be used for the production of other alkali metal or alkali metal alloy thin films from other alkali metal or alkali metal alloy sheets.

The rolling mill 10 has a main frame 16, a pair of working rollers 18a and 18b, a backup roller 20a adjacent to and in contact with the working roller 18a, a backup roller 20b adjacent to and in contact with the working roller 18b, a lamination lubricant dispensing unit 22 for dispensing lubricant onto the working roller 18a and a lamination lubricant dispensing unit 200 for dispensing lubricant onto the working roller 18a. As can be seen, the working roller 18a is disposed below the working roller 18b. The working rollers 18a, 18b and the lamination lubricant dispensing units 22, 200 will be described in more detail below. The working rollers 18a, 18b and the backup rollers 20a, 20b are rotationally mounted on support frames 50 and 52 (FIG. 2) as will be described in more detail below.

A roll 24 of wound extruded lithium or lithium alloy sheet 14 is placed on a feeding roller 26 comprising an drive motor control unit (not shown) adapted to control the tension of the lithium sheet 14 prior to reaching the working rollers 18a and 18b. The sheet 14 snakes its way through a series of free rollers 28 leading to an encoder roller 41 measuring the exact speed of the traveling sheet 14, and to a tension roller 43 equipped with a load cell adapted to precisely measure the tension on the sheet 14 entering the lamination apparatus 10. The load cell of tension roller 43 may be electronically coupled to the control unit of the drive motor of roll 24 to automatically adjust the tension exerted onto the sheet 14. The sheet 14 is then fed into a straightener 30 which rapidly winds the sheet 14 through a series of tightly packed rollers 32 which has the effect of eliminating lateral displacement of the sheet 14 and preventing zigzagging motion of the sheet 14 thereby ensuring that the sheet 14 is fed straight into the center portion of the working rollers 18a and 18b without any lateral weaving motion that would be detrimental to the lamination process. The sheet 14 is therefore fed into the working rollers 18a and 18b at a fixed position between the rollers 18a, 18b.

At the inlet of the rolling mill 10, the lubricant dispensing units 22 and 200 discharge an adequate amount of lamination lubricant compatible with lithium onto the working surfaces of each working roller 18a and 18b upstream from the lamination area such that the sheet 14 is laminated with properly lubricated working rollers 18a and 18b thereby preventing undesirable adhesion of the laminated film 12 onto either one of the working rollers 18a, 18b. One suitable lubricant is described in U.S. Pat. Nos. 5,837,401 and 6,019,801, the entirety of which are incorporated herein by reference. In one embodiment, the lubricant is based on toluene, hexane and a polyoxyethylene distearate and is used in sufficient quantity onto each working roller 18a and 18b to prevent excessive adhesion of the laminated film 12 onto either of them.

The sheet 14 passes between the two working rollers 18a and 18b where its thickness is reduced from about 100 to 500 microns to about 20 to 100 microns depending on the desired final thickness of the film 12. Pressure is applied by the backup rollers 20a and 20b onto the working rollers 18a and 18b which in turn exert pressure on the sheet 14 sufficient to reduce its thickness and transform it into a film 12. The lamination pressure is applied through the backup rollers 20a and 20b instead of directly onto the working rollers 18a and 18b to help avoid any unwanted bending of the working rollers 18a and 18b which would be reflected on the shape and thickness of the film 12. As will be described below, the surface roughness of the working rollers 18a and 18b should be minimal to produce a thin film 12 of quality. The pressure applied by the backup rollers 20a and 20b onto the working rollers 18a and 18b is evenly distributed on the surfaces of each roller 18a and 18b, thereby leaving the shape of the working rollers 18a and 18b undisturbed. If however the working rollers 18a and 18b are sufficiently rigid, the necessary pressure required to reduce the thickness of the sheet 14 and transform it into the film 12 may be applied directly by the working rollers 18a and 18b without the use of any backup rollers. It is also contemplated that a plurality of backup rollers could be used to apply even pressure on each of the working rollers 18a and 18b. For instance, two pairs of backup rollers may be positioned on either side of the working rollers 18a and 18b.

The laminated film 12 is pulled through an optical refractory system 36 which measures the evenness of the surface of the film 12 and also detects any porosity on the film 12 and cracks along the edges of the film 12. An optical system can also be used to measure the thickness of the film 12. Controlled tension is applied onto the film 12 by a driven winding roller 38 to ensure that the film 12 is properly wound. Before reaching the winding roller 38, the laminated film 12 snakes its way under controlled tension through a series of rollers. The first of these rollers is a tension roller 45 equipped with a load cell adapted to precisely measure the tension on the laminated film 12 exiting the rolling mill 10. The load cell of the tension roller 45 may be electronically coupled to the control unit of the drive motor of the winding roller 38 to automatically adjust the tension exerted onto the sheet 12. The film 12 then passes over an encoder roller 47 measuring the exact speed of the traveling film 12. The film 12 then passes through a series of free rollers 34 leading to the winding roller 38.

A thin insulating film 90, such as a polypropylene film, is also wound around the winding roller 38 to separate the layers of film 12 such that they will not adhere to each other. The insulating film 90 is pulled by the winding roller 38 from a roll 92. From the roll 92, the insulating film 90 passes over a tension roller 94 before reaching the roller 38. The tension roller 94 is equipped with a load cell adapted to precisely measure the tension on the insulating film 90. This tension measurement is used to control the tension exerted by the winding roller 38 onto the film 12 since the tension exerted by the winding roller 38 is divided between the film 12 and the insulating film 90.

The encoder rollers 41 and 47 respectively measure the speed of the sheet 14 entering the rolling mill 10 and the speed of the laminated film 12 exiting the rolling mill 10. The relation between the entry speed of the sheet 14 and the exit speed of the laminated film 12 is directly proportional to the thickness reduction from the initial sheet 14 to the film 12. As such, the thickness of the laminated film 12 may be determined mathematically when the thickness of the initial sheet 14 is known. The thickness of the laminated film 12 is thus controlled and verified through the speed differential between the speeds measured by the encoder rollers 41 and 47. It is contemplated that the thickness of the laminated film 12 could be controlled and verified differently.

In one embodiment, the lamination process is carried out in an anhydride atmosphere containing less than 1% relative humidity to prevent any unwanted chemical reactions of the lithium film 12 with water particles that would render the lithium film 12 unsuitable for use in electrochemical cells.

Figure 2:
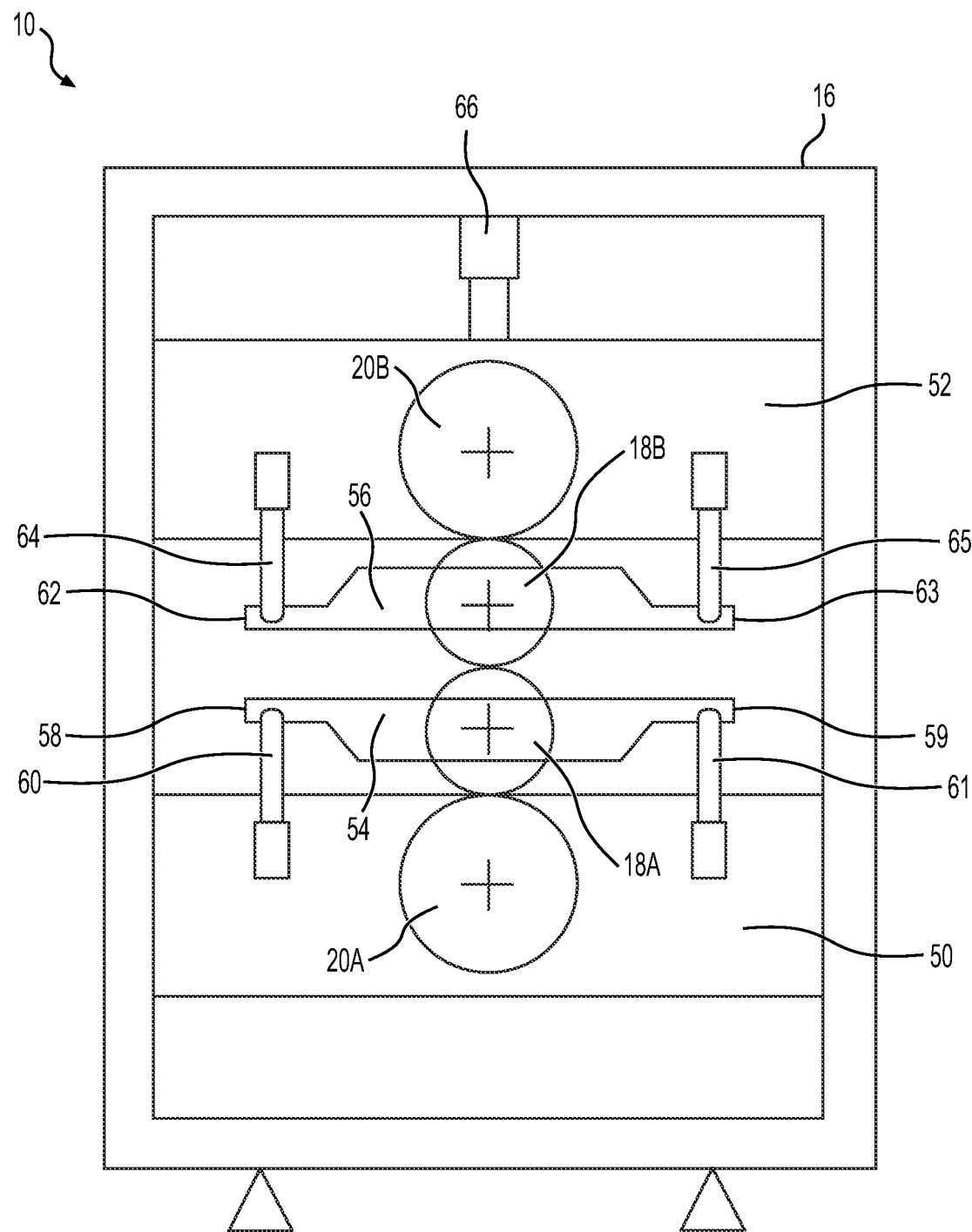
FIG. 2 is a schematic side elevational view illustrating the main components of the rolling mill of FIG. 1 that enable control of the thickness and shape of the lithium or lithium alloy film being laminated.
Figure 3:
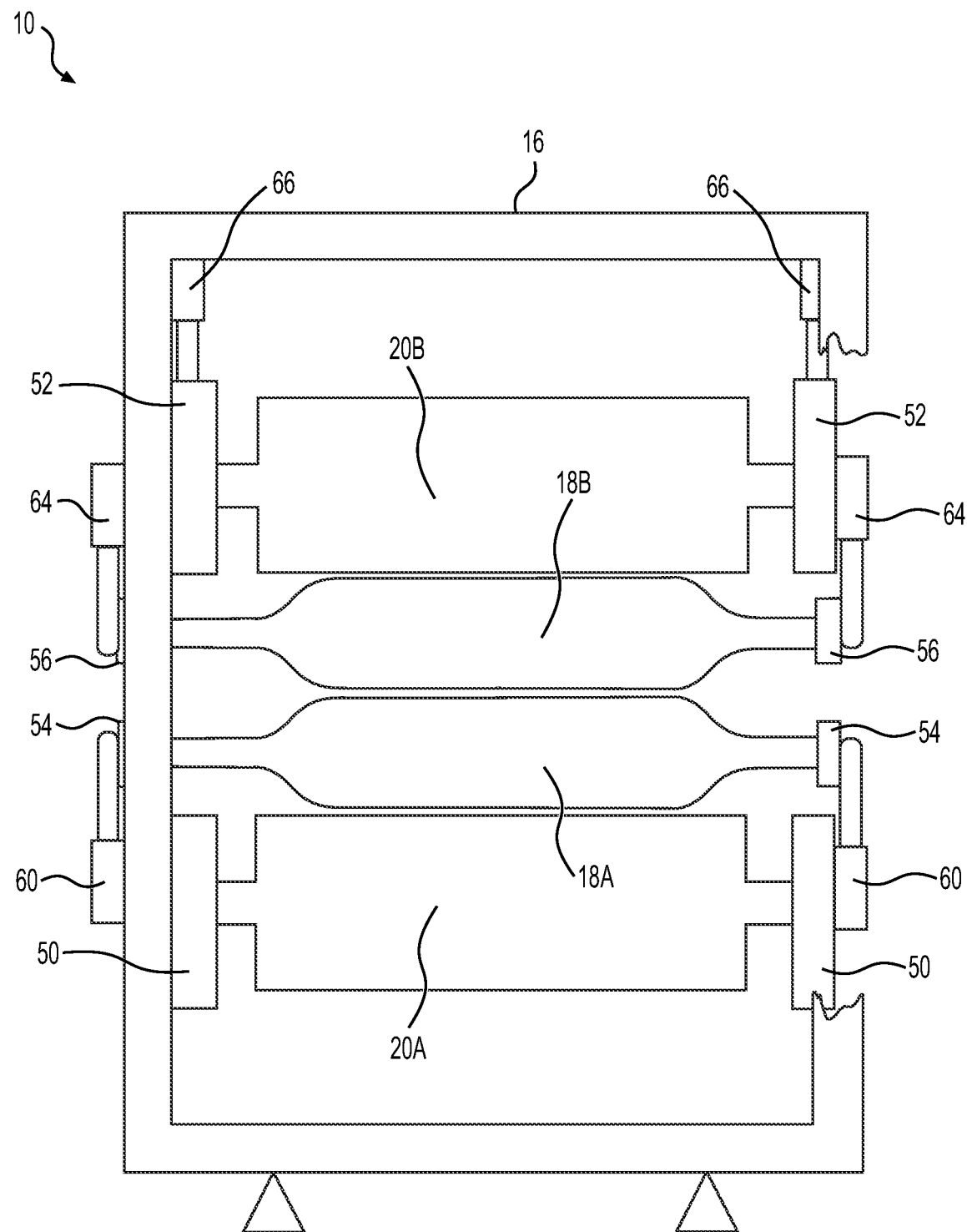
FIG. 3 is a schematic front elevational view of the main components of the rolling mill of FIG. 2.

Turning now to FIGS. 2 and 3, the main components of the rolling mill 10 that enable better control of the thickness and shape of the film 12 being laminated will be described. It should be understood that the illustrated rolling mill 10 is one exemplary embodiment of a rolling mill adapted to control the shape and thickness of the laminated film 12 and that other embodiments are contemplated. For instance, support members and frames may have different configurations, and various hydraulic system configurations may be used.

The backup rollers 20a and 20b are each rotationally mounted on bearings of support frames 50 and 52 respectively. The support frame 52 is slidably mounted onto vertical members of the main frame 16 through any suitable means, such as sliding channels or bearings. The support frame 50 is fixedly mounted onto the vertical members of the main frame 16. The support frame 52 may therefore move vertically. The working rollers 18a and 18b are each driven by electric or hydraulic motors (not shown). The working rollers 18a, 18b drive the backup rollers 20a and 20b by friction. A pair of hydraulic linear actuators 66 is mounted to upper horizontal members of the main frame 16. The hydraulic actuators are connected to the support frame 52. The hydraulic linear actuators 66 control the up and down movements of the support frame 52, as well as the pressure applied onto the working rollers 18a and 18b. The working rollers 18a and 18b are rotationally mounted onto supporting members 54 and 56 respectively. The supporting members 54 and 56 are operationally linked to the support frames 50 and 52 respectively. The end portions 58 and 59 of the supporting members 54 are operatively connected to the support frame 50 via a pair of hydraulic linear actuators 60 and 61 and the end portions 62 and 63 of supporting members 56 are operatively connected to the support frame 52 via a pair of hydraulic linear actuators 64 and 65.

In operation, the speed of lamination is set by the speed of working rollers 18a and 18b. The pressure P necessary to reduce the thickness of the film 12 to the desired thickness is adjusted through hydraulic valves controlling the hydraulic linear actuators 66. The backup roller 20b transfers the pressure P to the working roller 18b. Once the desired pressure P is set, the final shape of laminated film 12 is fine-tuned by regulating the fluid pressure to each of the hydraulic linear actuators 60, 61, 64 and 65 thereby adjusting the forces exerted by each of the hydraulic linear actuators 60, 61, 64 and 65 onto the supporting members 54 and 56 as will be explained in more detail below. The hydraulic linear actuators 60, 61, 64, 65 and 66 may be replaced by other types of actuators capable of generating sufficient forces, such as electric actuators. In an alternative embodiment, additional hydraulic linear actuators are connected between the supporting members 54, 56. In such an embodiment, the hydraulic linear actuators 60, 61, 64, 65 and 66 are used to push the supporting members 54, 56 toward each other and the additional hydraulic linear actuators are used to push the supporting members 54, 56 toward each other.

During the lamination process, heat builds up into the working rollers 18a and 18b through friction generated at the lamination surfaces with the effect of slightly dilating the working rollers 18a and 18b. The dilation of the working rollers 18a, 18b by a few microns in the lamination zone is enough to produce a film 12 of uneven thickness that is unsuitable for thin film electrochemical cells. To alleviate this problem and help ensure a film 12 of even thickness, the center portions 100 (FIG. 4A) of the dilated working rollers 18a and 18b is adjusted by bending the working rollers 18a and 18b to straighten the center portions 100 and produce an even thickness lithium film 12. This control process will be described below with respect to FIGS. 4A to 4C. Note that the shapes of the working rollers 18a and 18b illustrated in FIGS. 4A to 4C are greatly exaggerated for the sake of clarity, but it should be understood that the tapering of the end portions of the working rollers 18a, 18b and the bent profiles are in fact not visible to the naked eye as they represent mere microns of deviations from a perfectly linear profile.

Figure 4A:
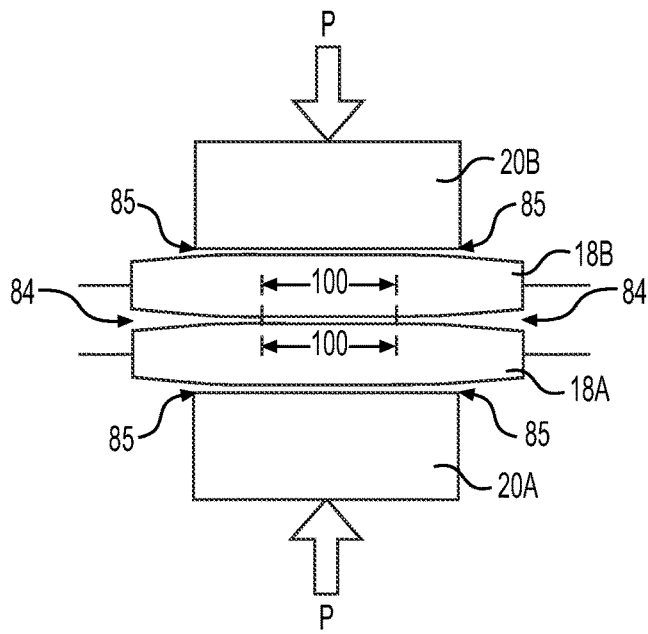
FIGS. 4A to 4C are schematic front elevational views of backup rollers and working rollers of the rolling mill of FIG. 2 shown in different adjustments, with angles of frustoconical portions of the working rollers and the degree of bending of the working rollers having been exaggerated for illustration purposes.

FIG. 4A illustrates the working rollers 18a and 18b in a neutral position. The backup rollers 20a and 20b apply a pressure P onto the working rollers 18a and 18b sufficient to reduce the thickness of the sheet 14 to the desired thickness of film 12 while no lateral force is applied to the supporting members 54 and 56 of the working rollers 18a, 18b.

Figure 4B:
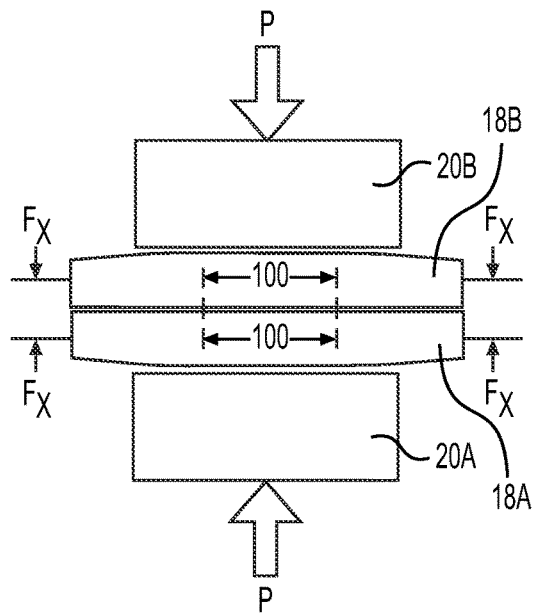
Figure 4C:
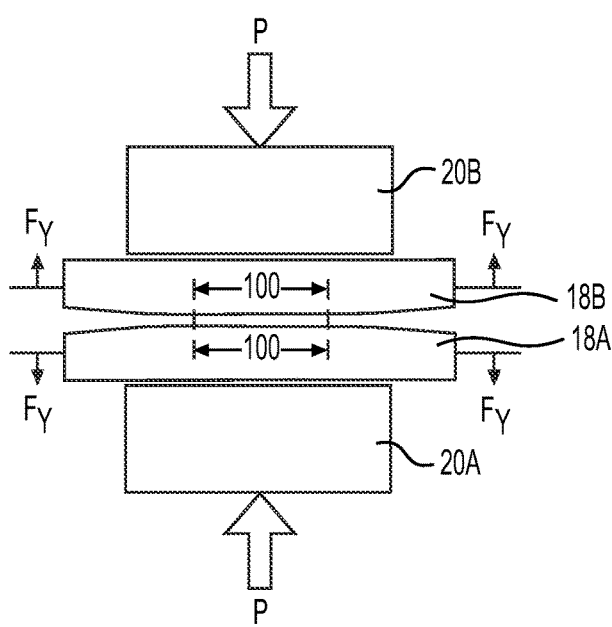

In FIG. 4b, the backup rollers 20a and 20b still apply a pressure P onto the working rollers 18a and 18b sufficient to reduce the thickness of the sheet 14 to the desired thickness of film 12. However, due to thermal dilation, the center portion of the working rollers 18a and 18b have expanded through heat build-up generated by friction of the center portions 100 against the sheet 14. To compensate this heat dilation which has deformed the working rollers 18a and 18b, inwardly oriented lateral forces Fx are applied to the supporting members 54 and 56. The lateral forces Fx slightly bend the working rollers 18a and 18b outwardly, thereby flattening the center portions 100 as depicted in FIG. 4B. The outside edges of the working rollers 18a and 18b are bent inwardly to straighten the center portions 100. The resulting laminated film 12 will therefore be flat and have an even thickness. Thermal dilation of the working rollers 18a, 18b is also partly counteracted by the application of the lamination lubricant onto the working rollers 18a, 18b. It is also contemplated that additional means of cooling the working rollers 18a, 18b could be used to help counteract the thermal dilation of the working rollers 18a, 18b.

When the edges of the sheet 14 being laminated are thicker than its central portion, in order to laminate a film 12 having an even thickness throughout its width, more pressure is to be applied by the working rollers 18a and 18b to the outside edges of the sheet 14 and therefore to the outer edges of the center portions 100. To do so, the same lateral forces Fx are applied to the supporting members 54 and 56 thereby slightly bending the outer edges of the working rollers 18a and 18b inwardly, and applying more pressure to the edges of the sheet 14 than to its central portion. As a result, the laminated film 12 has an even thickness throughout its width. As heat builds-up in the working rollers 18a and 18b through friction of the center portions 100 against the sheet 14, the center portions of the working rollers 18a and 18b dilate marginally. To compensate for this heat dilation which is marginally increasing the diameters of the center portions of the working rollers 18a and 18b, the lateral forces Fx are proportionally reduced to maintain the center portions 100 straight such that the resulting laminated film 12 will have an even thickness throughout its entire width.

At times, the central portion of the sheet 14 being laminated can be thicker than its edges. In order to laminate a film 12 having an even thickness throughout its width, more pressure must be applied by the working rollers 18a and 18b onto the central portion of the sheet 14 and therefore to the central portions of center portions 100. As shown in FIG. 4c, to do so, outwardly oriented lateral forces Fy are applied to the supporting members 54 and 56. The lateral forces Fy slightly bend the central portion of the working rollers 18a and 18b inwardly forcing the central portions of the center portions 100 inwardly thereby applying more pressure onto the central portion of the sheet 14 and laminating a film 12 having an even thickness throughout its entire width.

In some circumstances, heat generated by the friction of the center portions 100 against the sheet 14 will build up in the outside portions of the meeting surfaces of working rollers 18a and 18b and dilate them, opening a small gap in the central portion of the center portions 100. To compensate this heat dilation, outwardly oriented lateral forces Fy are applied to the supporting members 54 and 56 of the working rollers 18a and 18b. The lateral forces Fy slightly bend the central portion of the center portions 100 inwardly and straightening center portions 100. The profiles of the center portions 100 of the working rollers 18a, 18b are bent back into straight lines such that the resulting laminated film 12 will be flat and have an even thickness throughout its entire width.

Although only symmetrical adjustments of the working rollers 18a, 18b have been shown in FIGS. 4B and 4C, because the supporting members 54 and 56 are independent from each other, other adjustments are possible. For instance, if the working rollers 18a, 18b dilate more on one side than the other, the left or the right supporting members 54, 56 may have a force Fx or Fy exceeding the force Fx or Fy of the supporting members 54, 56 on the opposite side such that a multitude of fine tuning adjustments are possible.

The adjustments of the shape of center portions 100 combined with the precise measurements of an adequate measuring device such as the optical refractory system 36 enables the rolling mill 10 to produce a laminated film 12 of quality in the range of thickness from 20 to 100 microns that exhibits a near constant thickness throughout its entire length and width.

The adjustments of the profile and thickness of laminated film 12 may either be performed by an operator on site that fine tunes the pressures applied by backup rollers 20a and 20b and the pressures applied to the supporting members 54 and 56 or this task may be performed electronically by linking the measurement readings and the actuators controlling the various pressures and forces of the backup rollers 20a, 20b and the working rollers 18a, 18b to a computer providing real-time adjustments of theses parameters.

Figure 5:
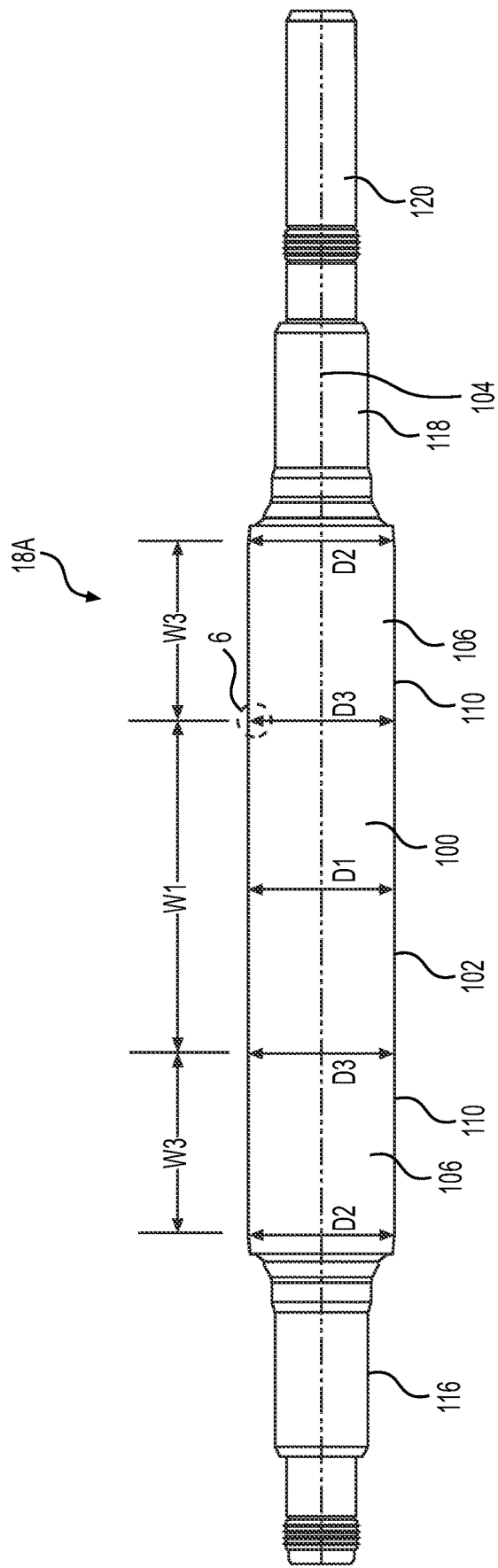
FIG. 5 is a front elevation view of one working roller of the rolling mill of FIG. 2.
Figure 6A:
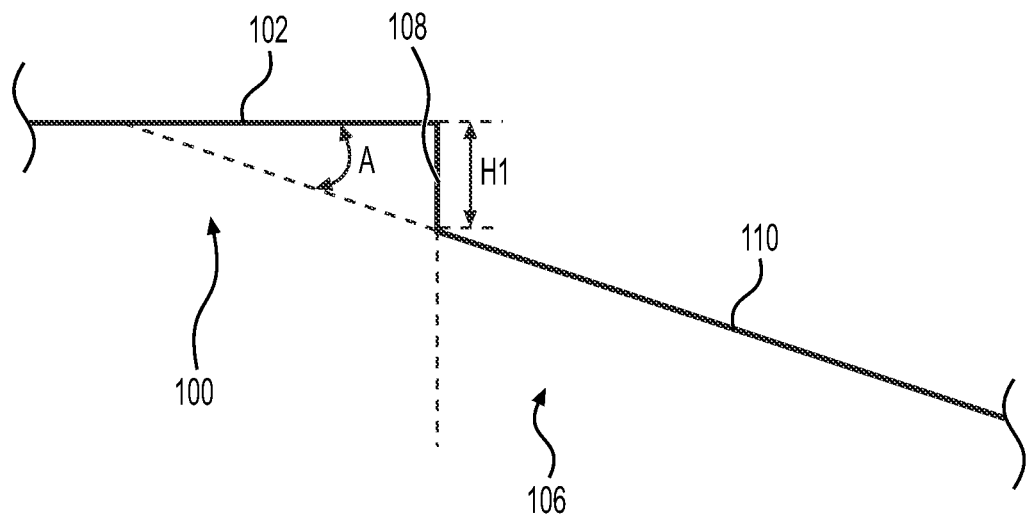
FIG. 6A is a close-up of section 6 of FIG. 5 according to one embodiment of the roller of FIG. 5.
Figure 6B:
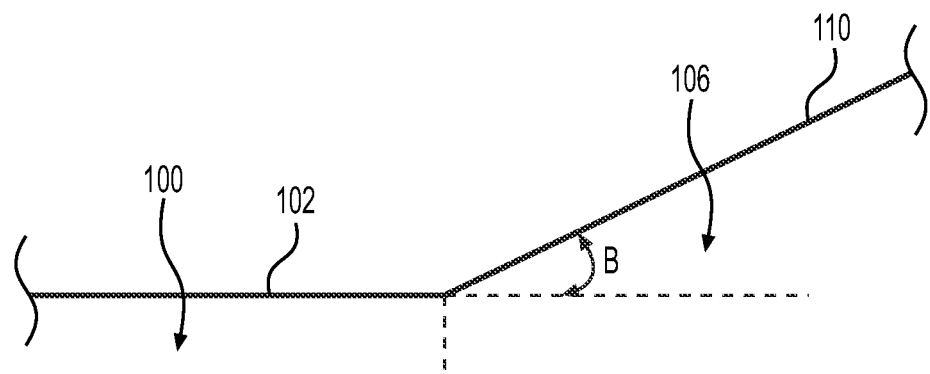
FIG. 6B is a close-up of section 6 of FIG. 5 according to another embodiment of the roller of FIG. 5.

Turning now to FIGS. 5 to 6B, the working roller 18a will be described in more detail. In the present embodiment, the working roller 18b is identical to the working roller 18a, as such the working roller 18b will not be separately described herein. It is contemplated that the working roller 18b could differ in part from the working roller 18a.

As previously mentioned, the working roller 18a has a center portion 100. The center portion 100 is a cylindrical center portion 100. An outer surface 102 of the center portion 100 defines a lamination surface which rolls over the sheet 14 during the lamination process. As such, the center portion 100 has a width W1 that is slightly wider than a width W2 (FIG. 7) of the sheet 14 to be laminated. The center portion 100 defines a central axis 104 of the working roller 18a.

Frustoconical portions 106 extend from the ends of the center portion 100. The frustoconical portions 106 are mirror images of each other. In FIG. 5 the outer surfaces 110 of the frustoconical portions 106 do not appear to taper. This is because the tapering angle is very small and is not visible to the naked eye. This angle has been exaggerated in FIGS. 6A and 6B which illustrate two different embodiments of the working roller 18a and will be described below. Each frustoconical portion 106 has a width W3. The width W1 of the center portion 100 is greater than the width W3 of each frustoconical portion 106. The width W1 of the center portion 100 is less than a sum of the widths W3 of both frustoconical portions 106 (i.e. W1<W3+W3). In some embodiment, the width W1 is between 125 mm and 210 mm and the width W3 is between 65 mm and 110 mm.

Figure 7:
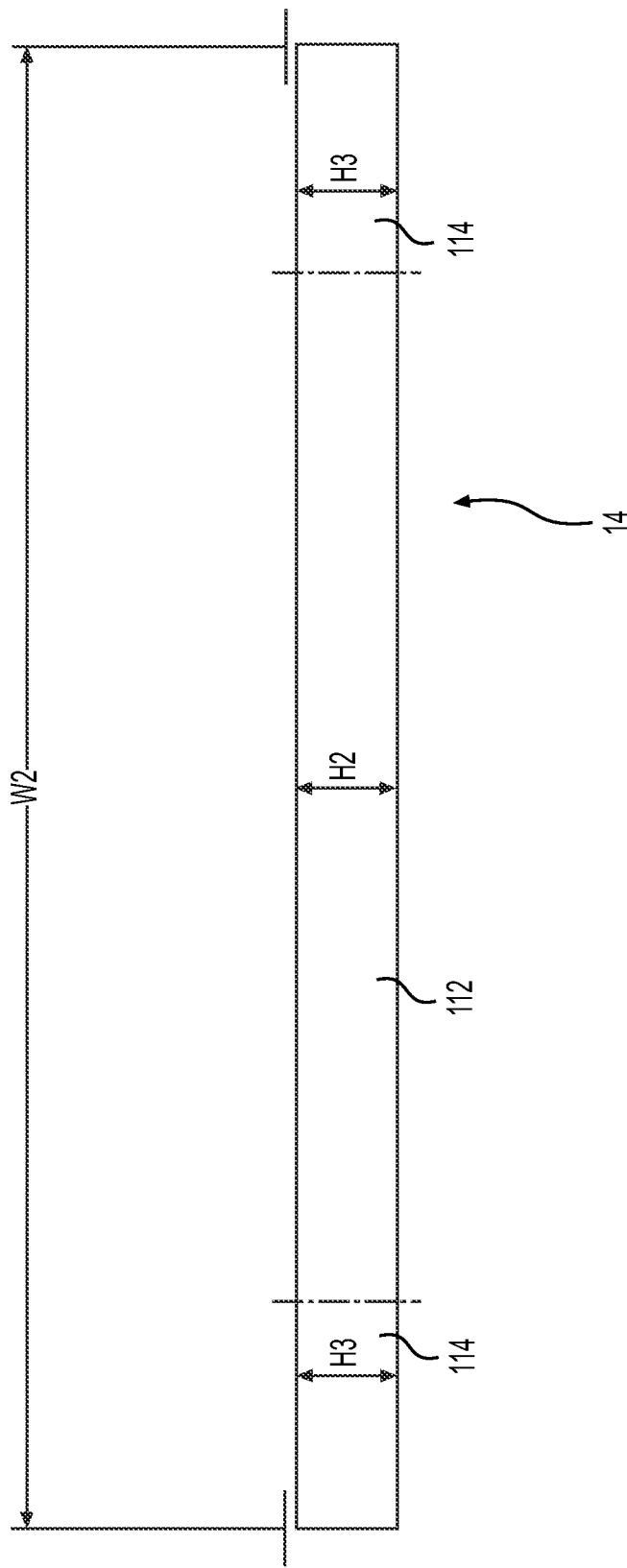
FIG. 7 is a schematic cross-sectional profile of the lithium or lithium alloy sheet supplied to the rolling mill of FIG. 2.

In one embodiment illustrated in FIG. 6A, the frustoconical portions 106 taper as they extend away from the center portion 100. This embodiment is the one shown in FIGS. 4A to 4C where the tapering has been exaggerated. In this embodiment, shoulders 108 are defined between the center portion 100 and each frustoconical portion 106 (shown for one frustoconical portion in FIG. 6A). In some embodiments, the shoulders 108 have a height H1 that is less than 0.05 mm. In some embodiments, the height H1 is less than 0.02 mm. It is contemplated that the shoulders 108 could be omitted. When the central axis 104 is straight (i.e. when the working roller 18a is in the neutral position as in FIG. 4A), an angle A between the outer surface 102 of the center portion 100 and an outer surface 110 of the frustoconical portion 106 is less than 0.05 degrees. In some embodiment, the angle A is less than 0.03 degrees. In some embodiments, the angle A is less than 0.02 degrees. In some embodiments, the angle A is less than 0.02 degrees but more than 0.01 degrees. In some embodiments, the center portion 100 has a diameter D1 between 70 mm and 90 mm. In some embodiments, a difference between the smallest diameter D2 and the greatest diameter D3 of each frustoconical portion 106 is between 0.03 mm and 0.17 mm. The profiles of the working rollers 18a and 18b according to this embodiment facilitate their bending by providing free zones 84 (FIG. 4A) between the frustoconical portions 106 and free zones 85 (FIG. 4A) between the frustoconical portions 106 and the backup rollers 20a and 20b such that the ends of the working rollers 18a and 18b may be moved to bend the center portions 100 as desired. The free zones 84 also allow excess lamination lubricant to be evacuated laterally during the lamination process. Although the working roller 18a of the embodiment shown in FIG. 6A could be used with a sheet 14 having many different profiles thanks to the adjustments that can be made in the rolling mill 10 (as discussed above with respect to FIGS. 4A to 4C), this embodiment of the working roller 18a is particularly well suited for laminating a sheet 14 which has been extruded with a central portion 112 having a height H2 (FIG. 7) that is smaller than a height H3 of its side portions 114 (FIG. 7). Again, in FIG. 7 the heights H2 and H3 do not appear to be different because the difference is not visible to the naked eye. In some embodiments, the height H2 is less than 15 microns smaller that the height H3.

In another embodiment illustrated in FIG. 6B, each frustoconical portions 106 tapers as is extends from its outer end toward the center portion 100 (i.e. D2 is greater than D3). When the central axis 104 is straight (i.e. when the working roller 18a is in the neutral position), an angle B between the outer surface 102 of the center portion 100 and an outer surface 110 of the frustoconical portion 106 is less than 0.05 degrees. In some embodiment, the angle B is less than 0.03 degrees. In some embodiments, the angle B is less than 0.02 degrees. In some embodiments, the angle B is less than 0.02 degrees but more than 0.01 degrees. In some embodiments, the center portion 100 has a diameter D1 between 70 mm and 90 mm. In some embodiments, a difference between the greatest diameter D2 and the smallest diameter D3 of each frustoconical portion 106 is between 0.03 mm and 0.17 mm. Although the working roller 18a of the embodiment shown in FIG. 6B could be used with a sheet 14 having many different profiles thanks to the adjustments that can be made in the rolling mill 10 (as discussed above with respect to FIGS. 4A to 4C), this embodiment of the working roller 18a is particularly well suited for laminating a sheet 14 which has been extruded with a central portion 112 having a height H2 (FIG. 7) that is greater than a height H3 of its side portions 114 (FIG. 7). In some embodiments, the height H2 is less than 15 microns bigger that the height H3.

Returning to FIG. 5, the working roller 18a has support shafts 116, 118 extending from the ends of the frustoconical portions 106. The supports shafts 116, 118 are received in bearings (not shown) for rotationally mounting the working roller 18a to the supporting members 54 (or to the supporting members 56 for the working roller 18b). The support shaft 118 has an extension 120 adapted for connection to the motor driving the working roller 18b.

The portions 100, 106, and the support shafts 116, 118 are integrally formed.

Figure 8:
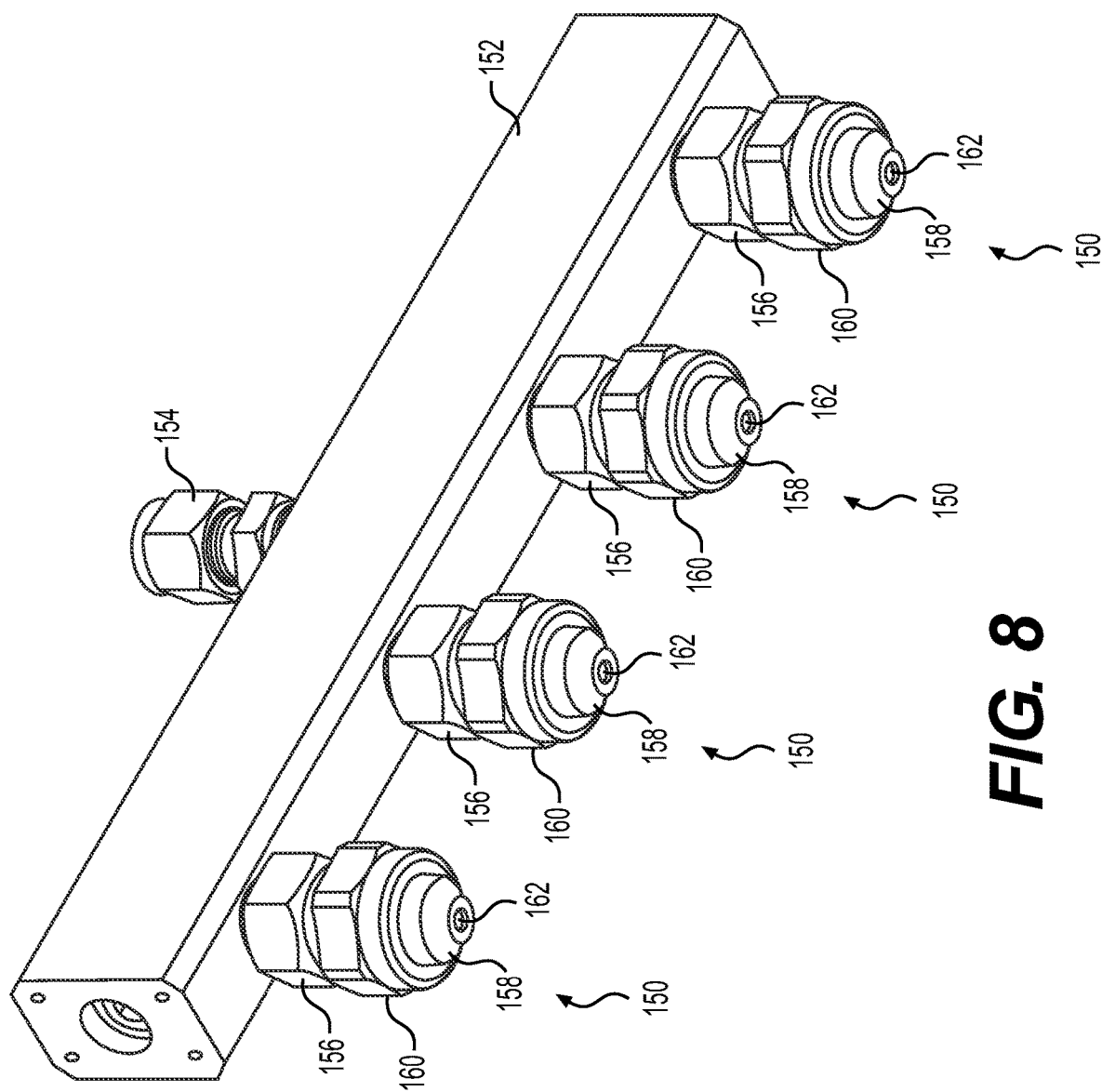
FIG. 8 is a perspective view of a lamination lubricant dispensing unit for lubricating an upper working roller of the rolling mill of FIG. 1.
Figure 9:
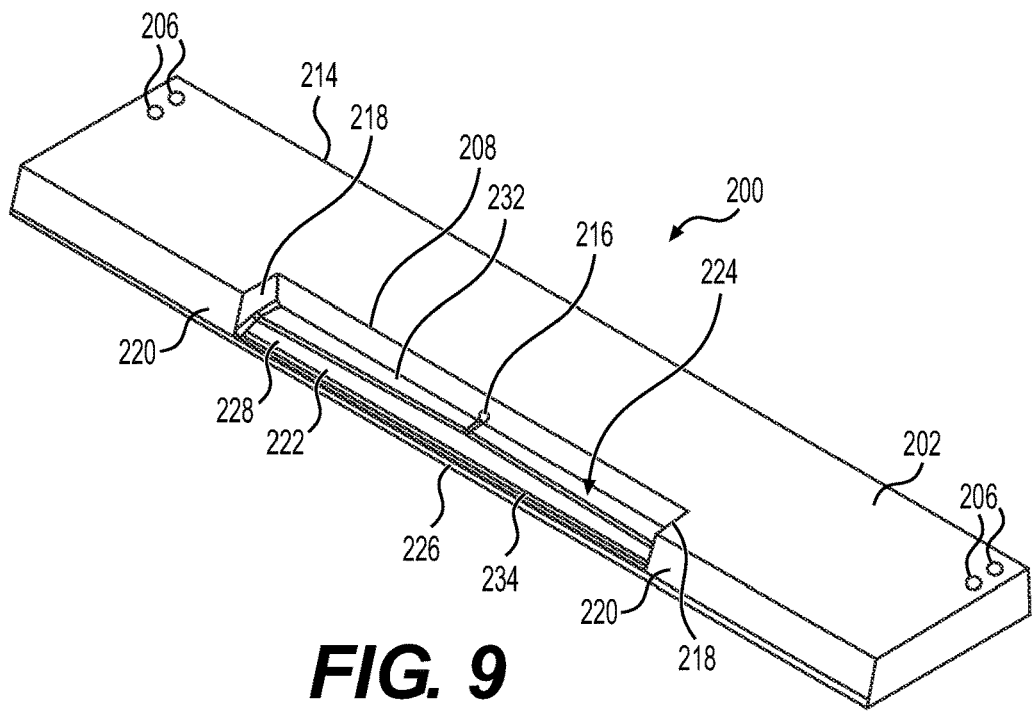
FIG. 9 is a perspective view of a lamination lubricant dispensing unit for lubricating a lower working roller of the rolling mill of FIG. 1.

As previously mentioned, the lamination lubricant dispensed onto the working rollers 18a and 18b helps prevent adhesion of the lithium film 12 onto the working rollers 18a, 18b such that the film 12 exits the working rollers 18a and 18b in a straight line. The use of lubricant enables to laminate lithium and lithium alloys with the working rollers 18a, 18b made of material that would normally not be adequate because of their adhesion to lithium. The lubricant negates this restriction. Therefore, for large-scale production, the working rollers 18a, 18b are preferably made of durable hard material such as steel or stainless steel or even ceramic. In some embodiments, the steel or stainless steel rollers 18a, 18b have a thin chrome coating for added hardness. The chrome coating is applied at least on the center and frustoconical portions 100, 106 of the working rollers 18a, 18b. In some embodiments, the chrome coating is a hard chrome coating. In order to provide the desired surface finish for the film 12 and to permit some adherence of the lamination lubricant onto the working rollers 18a, 18b, in some embodiments the outer surfaces 102, 110 of the center and frustoconical portions 100, 106 have a surface roughness in a range between 0.025 microns Ra and 0.5 microns Ra. In other embodiments, the surface roughness is in a range between 0.05 microns Ra and 0.30 microns Ra Turning now to FIG. 8, the lamination lubricant dispensing unit 22 will be described in more detail. The lamination lubricant dispensing unit 22 includes four nozzles 150 mounted to a rail 152. It is contemplated that the lamination lubricant dispensing unit 22 could have more or less than four nozzles 150. Lamination lubricant is supplied to a passage (not shown) inside the rail 152 via an intake connector 154. The intake connector 154 is fluidly connected to a pump (not shown) that supplies lubricant to the intake connector 154 from a lubricant reservoir (not shown) holding the lamination lubricant therein. The four nozzles 150 fluidly communicate with the passage inside the rail 152. As can be seen in FIG. 1, the lamination lubricant dispensing unit 22 is disposed upstream of the lamination area and is spaced from the working roller 18b. The lamination lubricant dispensing unit 22 is disposed above the central axis 104 of the working roller 18b and is angled such that the nozzles 150 continuously spray lamination lubricant on the lamination surface of the working roller 18b. The sprays from the nozzles 150 cover an area slightly wider than the lamination surface.

Each nozzle 150 has a nozzle body 156, a filter, a nozzle head 158 and a nut 160. The nozzle body 156 is threaded into the rail 152. The filter is disposed inside the nozzle body 156. The nozzle head 158 defines a spray aperture 162 and is disposed on the end of the nozzle body 156. The nut 160 is disposed over the nozzle body 156 and is threaded onto the nozzle body 156 to maintain the nozzle head 158 and the filter in position.

Turning now to FIGS. 9 to 13, the lamination lubricant dispensing unit 200 will be described. In the present embodiment, the lamination lubricant dispensing unit 200 is made from a single piece of static-dissipative acetal copolymer. It is contemplated that other types of materials could be used such as polyamide, polypropylene, polyethylene, acrylonitrile butadiene styrene, polyethylene terephthalate, polystyrene, thermoplastic polyurethane, poly(methyl methacrylate), polyvinyl chloride, brass and aluminum for example. Other materials are also contemplated. It is also contemplated that the lamination lubricant dispensing unit 200 could be made from multiple parts bonded or otherwise connected to each other.

Figure 12:
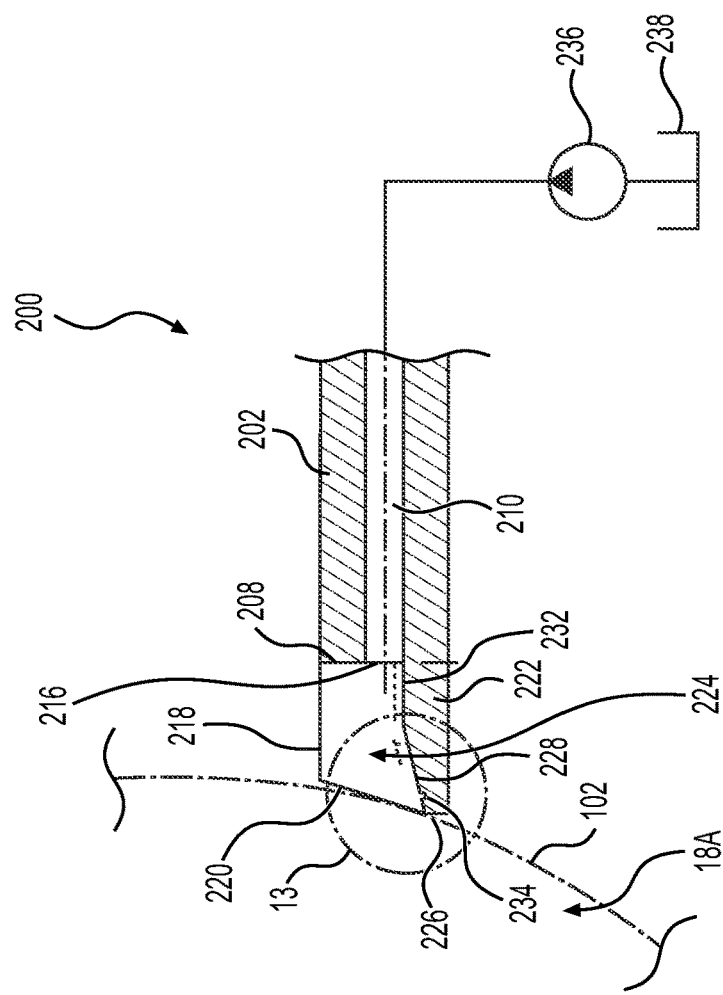
FIG. 12 is a cross-sectional view of the lamination lubricant dispensing unit of FIG. 9 taken through line 12-12 of FIG. 10.

The lamination lubricant dispensing unit 200 has a dispensing unit body 202. Each rear corner portion of the dispensing unit body 202 defines two apertures 206. Fasteners (not shown) are received in the apertures 206 to fasten the dispensing unit body 202 to the frame 16 of the rolling mill 10 at a position between the working roller 18a and the straightener 30. The dispensing unit body 202 defines a laterally extending wall 208. A single lubricant passage 210 is defined in the dispensing unit body 202 as best seen in FIG. 12. The lubricant passage 210 has an inlet (not shown) defined in a rear wall 214 of the dispensing unit body 202 and an outlet 216 defined in the laterally extending wall 208. As can be seen, the outlet 216 is laterally centered in the laterally extending wall 208 and is disposed at a bottom thereof. It is contemplated that multiple lubricant passages 210 could be defined in the dispensing unit body 202, with the outlets of these passages being at different positions along the laterally extending wall 208. It is also contemplated that at least some of these multiple lubricant passages 210 could have a common inlet.

Figure 10:
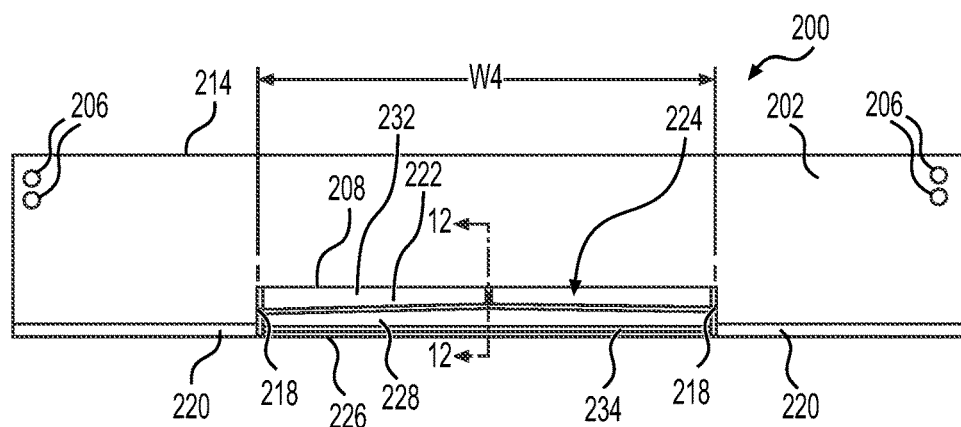
FIG. 10 is a top plan view of the lamination lubricant dispensing unit of FIG. 9.

Two side walls 218 extend forwardly from the laterally extending wall 208. As can be seen in FIG. 10, the side walls 218 are parallel to each other. As can be seen in FIG. 12, the front ends 220 of the side walls 218 are angled from vertical so as to not interfere with the working roller 18a.

The lamination lubricant dispensing unit 200 also has a ledge 222. The ledge 222 is connected to the lower end of the laterally extending wall 208 and extends forwardly therefrom. The ledge 222 is also connected to the lower ends of the side walls 218 and extends therebetween. The ledge 222, the side walls 218 and the laterally extending wall 208 together define a recess 224 having an opened side at a front of the lamination lubricant dispensing unit 200. The ledge 222 has a front edge 226 that abuts the lamination surface of the working roller 18a at a position vertically below the central axis 104 of the working roller 18a, as can be seen in FIG. 12. The front edge 226 has a width W4 (FIG. 10) that is greater than the width W1 of the lamination surface of the working roller 18a to help ensure that lamination lubricant will be applied across and entire width of the lamination surface.

Figure 11:
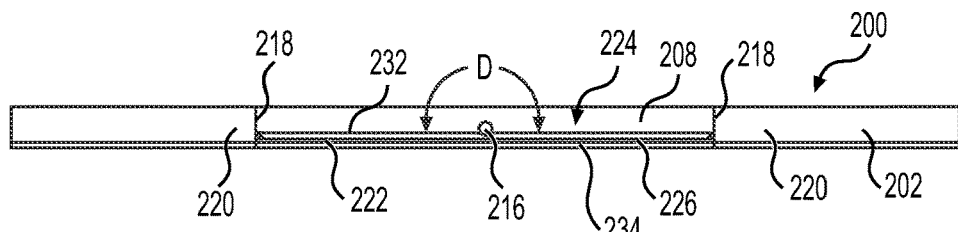
FIG. 11 is a front elevation view of the lamination lubricant dispensing unit of FIG. 9.
Figure 13:
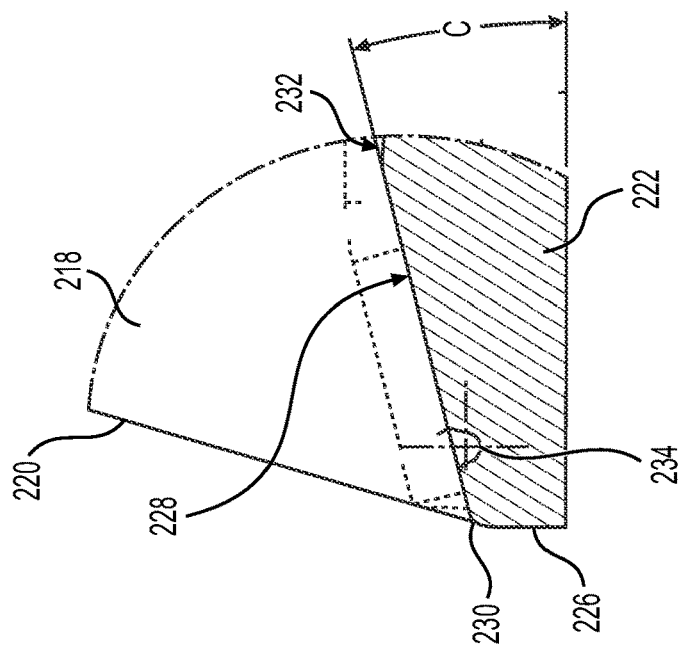
FIG. 13 is a close-up of portion 13 of FIG. 12.

With reference to FIG. 13, the ledge 222 has an angled portion 228 that extends upward and rearward from the front edge 226 toward the laterally extending wall 208. The corner 230 between the angled portion 228 and the front edge 226 is arcuate. In some embodiments, the angled portion 228 extends at an angle C between 5 and 25 degrees from horizontal. In some embodiments, the angle C is between 10 and 20 degrees from horizontal. The ledge 222 also has a generally horizontal portion 232 extending between the angled portion 228 and the laterally extending wall 208. The portion 232 is horizontal when viewed from the side (i.e. as viewed in FIGS. 12 and 13). However, from a front view of the portion 232 (i.e. as viewed in FIG. 11), the portion 232 slopes slightly downward on both sides of its lateral center, which therefore corresponds to the apex of the portion 232. In some embodiments, the angle D (FIG. 11) between the surfaces on both sides of the lateral center of the portion 232 is greater than 180 degrees but less than 185 degrees, and in some embodiments less than 182 degrees. It is also contemplated that the portion 232 could also be flat (i.e. angle D being 180 degrees) as viewed from the front view of the portion 232 (i.e. as viewed in FIG. 11). As can be seen in FIGS. 11 and 12, the outlet 216 of the lubricant passage 210 is laterally aligned with the apex of the portion 232 and the bottom of the outlet 216 is vertically aligned with the top of the portion 232 of the ledge 222 adjacent to it. It is contemplated that the portion 232 could be omitted and that the angled portion 228 could extend from the front edge 226 to the laterally extending wall 208.

A laterally extending gutter 234 is defined in the angled portion 228 of the ledge 222. As best seen in FIG. 10, the ends of the gutter 234 are spaced from the side walls 218. The gutter 234 is spaced from the front edge 226 of the ledge 222. As can be seen in FIG. 13, the gutter 234 is closer to the front edge 226 than to the portion 232 of the ledge 222.

With reference to FIG. 12, the inlet of the lubricant passage 210 is fluidly connected to a pump 236, which is itself fluidly connected to a lubricant reservoir 238. The lubricant reservoir 238 holds the lamination lubricant therein. It is contemplated that the lubricant reservoir 238 could also be used for supplying the lamination lubricant to the lamination lubricant dispensing unit 22 described above. The pump 236 pumps lamination fluid from the lubricant reservoir 238 into the lubricant passage 210. From the outlet 216 of the lubricant passage 210, the lubricant flows forward and laterally (due to angle D) along the portion 232 of the ledge. The lubricant then flows down along the angled portion 228. Some of the lubricant will flow into the gutter 234 which helps ensure an even distribution of lubricant across a width of the ledge 222. The lubricant then flows to the front edge 226 where it makes contact with the lamination surface of the working roller 18a. The upwardly moving lamination surface of the working roller 18a picks up lubricant which effectively coats the lamination surface that will make contact with the sheet 14.

In some embodiments, the alkali metal or alkali metal alloy film of the present technology is a laminated lithium film or a laminated lithium alloy film obtained using the rolling mill and working rollers as defined herein.

The lithium alloys that may be used to prepare the films of the present technology include, but are not limited to: Lithium-Silicon, Lithium-Aluminum, Lithium-Magnesium, Lithium-Strontium, Lithium-Barium and the like.

The lithium or lithium alloy films of the present technology comprise an amount of metallic element. The addition of a metallic element to the lithium or lithium alloy films allows to decrease the overall thickness of the film and to improve its overall mechanical strength. In some instances, the metallic element is present in the lithium or lithium alloy film in an amount that improves the mechanical strength throughout the width, thickness and length of the film.

The metallic element that may be used in the preparation of the lithium or lithium alloy films of the present technology is preferably electrically conductive. It is to be understood that the presence of the metallic element should not impede the electrical conductivity of the lithium or lithium alloy film. For example, aluminum is a metallic element that can be used in the lithium or lithium alloy film. In some instances, aluminum is present in the film in an amount ranging between about 3000 ppm and about 10 000 ppm, or between about 3000 ppm and about 9000 ppm, or between about 3000 ppm and about 8000 ppm, or between about 3000 ppm and about 7000 ppm, or between about 3000 ppm and about 6000 ppm, or between about 3000 ppm and about 5000 ppm. In some instances, aluminum is present in the film in an amount that is equal to or greater than 3000 ppm.

In some instances, the lithium or lithium alloy film of the present technology has a hardness as measured by a Shore durometer (Shore A scale) that ranges between about 50 and about 85, or between about 60 and about 80, or between about 60 and about 75, or between about 50 and about 70, or between about 60 and about 75, or between about 65 and about 75, or between about 66 and 70, or between about 66 and 69. In some instances, the hardness is of at least 65. In some other instances, the hardness is of at least about 66. In some instances, the hardness is even throughout the entire lithium or lithium alloy film.

The lithium film obtained by the technology defined herein has a width (which corresponds to the distance from one edge of the film to the other) that ranges between about 140 mm and about 200 mm, or between about 150 mm and about 200 mm, or between about 160 mm and about 180 mm, or between about 160 mm and about 175 mm, or between about 160 mm and about 170 mm, or between about 160 mm and 165 mm and has a thickness that ranges between about 20 microns and about 100 microns, or between 20 microns and about 90 microns, or between about 20 microns and about 75 microns, or between about 20 microns and about 50 microns, or between about 20 microns and 30 microns. The thickness of the lithium or lithium alloy film is even throughout the entire width of the film. The thickness being even throughout the entire width of the film encompasses a variation in thickness of about +/−2 microns.

In some embodiments, the lithium or lithium alloy films obtained by the technology defined herein have a thickness to width (t/w) ratio that is between about $1\times10^{-4}$ and about $7\times10^{-4}$. In some instances, this t/w ratio is maintained throughout the entire length of the film.

In particular, the present technology allows to maintain the width, thickness and hardness of the lithium or lithium alloy films even over extended film lengths. For example, the lithium or lithium alloy film of the present technology maintains its width, thickness and hardness over at least about 15000 meters, over at least about 10000 meters, over at least 9000 meters, over at least 8000 meters, over at least 7000 meters, over at least 6000 meters, over at least 5000 meters, over at least 4000 meters, over at least 3000 meters, over at least 2000 meters, or over at least over 1000 meters.

EXAMPLES

The examples below are given so as to illustrate the practice of various embodiments of the present technology. They are not intended to limit or define the entire scope of this technology. It should be appreciated that the technology is not limited to the particular embodiments described and illustrated herein but includes all modifications and variations falling within the scope of the disclosure as defined in the appended embodiments.

Example 1—Production of a Laminated Lithium Alloy Film (3000 ppm)

A laminated lithium film was prepared using a rolling mill comprising the working rollers as defined herein. The lithium film obtained had a width of 170 mm, a thickness of 60 microns and an aluminum content of 3000 ppm. Hardness of the film was assessed using a Shore durometer (PTC model 320—A Scale). The results are presented in Table 1.

TABLE 1

Hardness of a laminated LiAl film (3000 ppm Al)

| Sample | Hardness (Shore A) |
|---|---|
| 1 | 66 |
| 2 | 66 |
| 3 | 66 |
| 4 | 66 |
| 5 | 66 |

Example 2—Production of a Laminated Lithium Alloy Film (5000 ppm)

A laminated lithium film was prepared using a rolling mill comprising the working rollers as defined herein. The lithium film obtained had a width of 170 mm, a thickness of 60 microns and an aluminum content of 5000 ppm. Hardness of the film was assessed using a Shore durometer (PTC model 320—A Scale). The results are presented in Table 2.

TABLE 2

Hardness of a LiAl film (5000 ppm Al)

| Sample | Hardness (Shore A) |
|---|---|
| 1 | 68 |
| 2 | 69 |
| 3 | 68 |
| 4 | 68 |
| 5 | 67 |

Example 3—Assessing Tensile Strength of Laminated Lithium Alloy Film (3000 ppm)

A laminated lithium-aluminum film was prepared using a rolling mill comprising the working rollers as defined herein. The lithium film had a width of 170 mm, a thickness of 60 microns and an aluminum content of 3000 ppm. Tensile strength of the lithium film was assessed using a testometric M500 25 kN. The results are presented in Table 3.

TABLE 3

Tensile Strength of LiAl film (3000 ppm Al) at 10 mm/min

| Sample | UTS kgf/cm$^2$ | UTS mpa |
|---|---|---|
| 1 | 20.23 | 1.98 |
| 2 | 19.56 | 1.91 |
| 3 | 19.57 | 1.91 |
| 4 | 21.08 | 2.06 |
| 5 | 19.98 | 1.96 |

Example 4—Assessing Tensile Strength of Laminated Lithium Alloy Film (5000 ppm)

A laminated lithium-aluminum film was prepared using a rolling mill comprising the working rollers as defined herein. The lithium film had a width of 170 mm, a thickness of 60 microns and an aluminum content of 5000 ppm. Tensile strength of the lithium film was assessed using a testometric M500 25 kN. The results are presented in Table 4.

TABLE 4

Tensile Strength of LiAl film (5000 ppm Al) at 10 mm/min

| Sample | UTS kgf/cm$^2$ | UTS mpa |
|---|---|---|
| 1 | 23.41 | 2.30 |
| 2 | 22.52 | 2.20 |
| 3 | 22.63 | 2.21 |
| 4 | 23.47 | 2.30 |
| 5 | 23.28 | 2.28 |

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A rolling mill for laminating a sheet of alkali metal or alloy thereof into a film, the rolling mill comprising:
a frame;
a first working roller rotationally mounted to the frame;
a second working roller rotationally mounted to the frame, the first and second working rollers being positioned to receive the sheet therebetween;
a first backup roller rotationally mounted to the frame, the first backup roller being in contact with the first working roller for applying a pressure on the first working roller;
a second backup roller rotationally mounted to the frame, the second backup roller being in contact with the second working roller for applying a pressure on the second working roller;
at least two first actuators operatively connected to opposite ends of the first working roller for bending the first working roller; and
at least two second actuators operatively connected to opposite ends of the second working roller for bending the second working roller,
each of the first and second working rollers comprising:
a cylindrical center portion defining a central axis, the center portion having
an outer surface defining a lamination surface;
a first frustoconical portion extending from a first end of the center portion;
a second frustoconical portion extending from a second end of the center portion,
when the central axis is straight, an angle between the outer surface of the center portion and an outer surface of each of the first and second frustoconical portions being less than 0.05 degrees,
a width of the center portion being greater than a width of each of the first and second frustoconical portions,
the width of the center portion being less than a sum of the widths of the first and second frustoconical portions,
the first and second frustoconical portions tapering as they extend away from the center portion;
a first shoulder being defined between the center portion and the first frustoconical portion, the first shoulder extending radially inward from the first end of the center portion to an inner end of the first frustoconical portion;
a second shoulder being defined between the center portion and the second frustoconical portion, the second shoulder extending radially inward from the second end of the center portion to an inner end of the second frustoconical portion,
the first and second shoulders being disposed axially inward of ends of the first backup roller and of ends of the second backup roller as defined by a direction of the central axis;
a first support shaft extending from an outer end of the first frustoconical portion; and
a second support shaft extending from an outer end of the second frustoconical portion;
the at least two first actuators being operatively connected to the first and second support shafts of the first working roller for applying forces to the first and second support shafts of the first working roller,
the at least two second actuators being operatively connected to the first and second support shafts of the second working roller for applying forces to the first and second support shafts of the second working roller,
first free zones being provided between the first backup roller and the first and second frustoconical portions of the first working roller for permitting bending of the first working roller, and
second free zones being provided between the second backup roller and the first and second frustoconical portions of the second working roller for permitting bending of the second working roller.

2. The rolling mill of claim 1, wherein the angle is less than 0.03 degrees.

3. The rolling mill of claim 2, wherein the angle is less than 0.02 degrees.

4. The rolling mill of claim 3, wherein the angle is more than 0.01 degrees.

5. The rolling mill of claim 1, wherein, for each of the first and second working rollers, the center portion, the first frustoconical portion and the second frustoconical portion have a chrome coating.

6. The rolling mill of claim 5, wherein the chrome coating is a hard chrome coating.

7. The rolling mill of claim 1, wherein, for each of the first and second working rollers, the center portion, the first frustoconical portion and the second frustoconical portion have a surface roughness in a range between 0.025 microns Ra and 0.5 microns Ra.

8. The rolling mill of claim 7, wherein the range is between 0.05 microns Ra and 0.3 microns Ra.

* * * * *